United States Patent [19]
Mecklenborg

[11] 3,785,715
[45] Jan. 15, 1974

[54] PANORAMIC INFINITY IMAGE DISPLAY

[75] Inventor: Richard A. Mecklenborg, Binghamton, N.Y.

[73] Assignee: The Singer Company, Binghamton, N.Y.

[22] Filed: May 17, 1972

[21] Appl. No.: 254,023

[52] U.S. Cl. .................................. 350/55, 350/174
[51] Int. Cl. ........................................... G02b 17/00
[58] Field of Search .............................. 350/55, 174

[56] References Cited
UNITED STATES PATENTS

| | | | |
|---|---|---|---|
| 3,432,219 | 3/1969 | Shenker et al. ....................... 350/29 |
| 3,659,920 | 5/1972 | McGlasson ........................ 350/174 |
| 3,709,581 | 1/1973 | McGlasson ........................ 350/174 |

Primary Examiner—David H. Rubin
Attorney—James C. Kesterson

[57] ABSTRACT

A wide angle infinity image display particularly useful in combination with flight trainers and the like is shown. A first tier of abutting mirror beam-splitter displays is arranged around a viewing point and have as an input an intermediate image from a similar tier located above the first tier. With this arrangement it is possible to use a single input screen for the image source into the upper tier and avoid the use of correcting lens.

6 Claims, 4 Drawing Figures

PATENTED JAN 15 1974　3,785,715

PANORAMIC INFINITY IMAGE DISPLAY

BACKGROUND OF THE INVENTION

This invention relates to vehicle simulators in general and more particularly to an improved infinity image display system for use in such simulators.

As the cost of training in actual vehicles, such as modern commercial and military aircraft, large ships, and even trucks, etc., has risen there has been increased demand for better simulators and trainers in which training can be done at a much lower cost. One requirement of many of these trainers is a visual system which can provide the trainee with visual cues. Ideally a visual display should present as large a field of view as is present in the actual vehicle and also should be displayed at infinity.

One of the best means of developing an image at infinity is to use a spherical mirror as a collimator. If the image is placed at one half the radius of the mirror the desired result will occur. This would require the image to be between the observer, who would normally be near the center of curvature, and the mirror. To overcome this problem, a beamsplitter is employed so that the image to be collimated may be out of the path of the reflections from the mirror.

Such mirror-beamsplitter display systems are described in U. S. Pat. No. 3,432,219 and references cited therein. That patent also discloses a display with a 360° horizontal field of view built on these same principles and also shows using a second mirror beamsplitter combination to form an aerial image input to the final display system. For obvious reasons the 360° system must be made of a small size as shown. Each system disclosed also requires corrective lenses as is evident from an examination of the patent.

Thus where a wide angle display is needed for use, for example with a flight simulator, and is to be placed outside the cockpit the systems disclosed therein are not practical. Other methods of providing wide angle displays have been developed including the matrix display disclosed in U. S. Pat. Nos. 3,659,920 and 3,709,581 issued to F. W. McGlasson on May 2, 1972 and Jan. 9, 1973, respectively and assigned to the same assignee as thd present invention. Another is through use of the pancake window discussed therein. Each of these systems requires individual inputs for each of the displays which go to make up the total wide angle display. Thus difficult problems of matching separately generated images arise. It can be seen that there is a need for a system which will provide a wide angle display at infinity from a single input image.

SUMMARY OF THE INVENTION

The present invention allows a single input to be displayed at infinity over a horizontal field of view of up to 360°. A first tier of mirror-beamsplitter displays is arranged around the trainee viewpoint. A second symetrical tier is used to generate an intermediate image from a single image source, which intermediate image is used as an input to the first tier. Because of the arrangement the matching problems of the prior art are avoided as is the need for corrective lenses.

DETAILED DESCRIPTION

Figure 1:
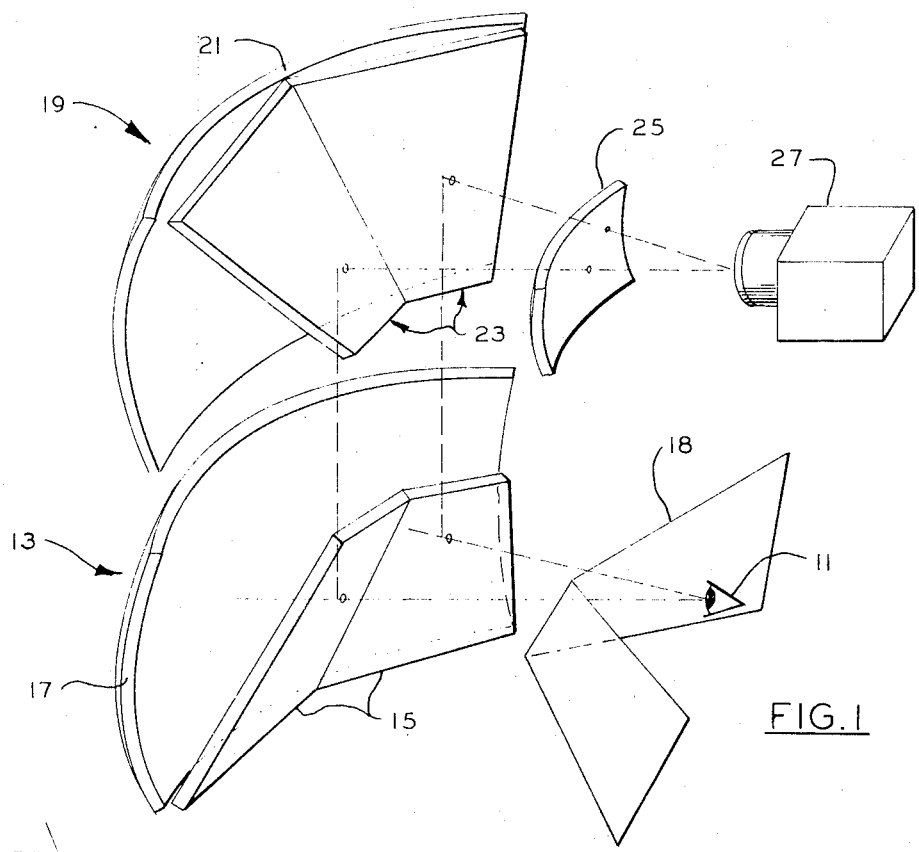
FIG. 1 is a perspective view of the preferred embodiment of the invention.

FIG. 1 is a perspective view of a preferred embodiment of the present invention. An observer with his eyepoint at 11 views a plurality of mirror-beamsplitter displays indicated collectively as 13 arranged in a zone of a sphere or portion thereof around point 11. Two beamsplitters 15 are shown with a common spherical mirror 17. It will be recognized that the mirror 17 may be made to enclose point 11 with additional beamsplitters 15 provided. Mirror 17 may also be made of abutting sections. It is well known in the art that if such a mirror-beamsplitter arrangement has an input at one half the radius of curvature of the mirror 17 the system will provide an image at infinity. Normally separate inputs would be provided for each mirror 15. For example see application Ser. No. 67,385 which also shows abutting displays. It will be recognized that the placement of an imaging surface containing a wide angle image so that it will be reflected by mirrors 15 would be difficult. Where the display can be placed close to the observer the approach such as that shown in U.S. Pat. No. 3,432,219 discussed above can be taken. But where it is desired to place the optical system outside a windscreen 18 of a simulated cockpit, for example, this scheme becomes impractical.

The system of the present invention instead uses a second symmetrical mirror beamsplitter combination 19 comprising spherical mirror 21 and beamsplitters 23 to provide an input to display 13. This eliminates aberations and avoids any corrective lenses. The input to combination 19 is from a spherical screen 25 obtaining its image from a projector 27.

Figure 2:
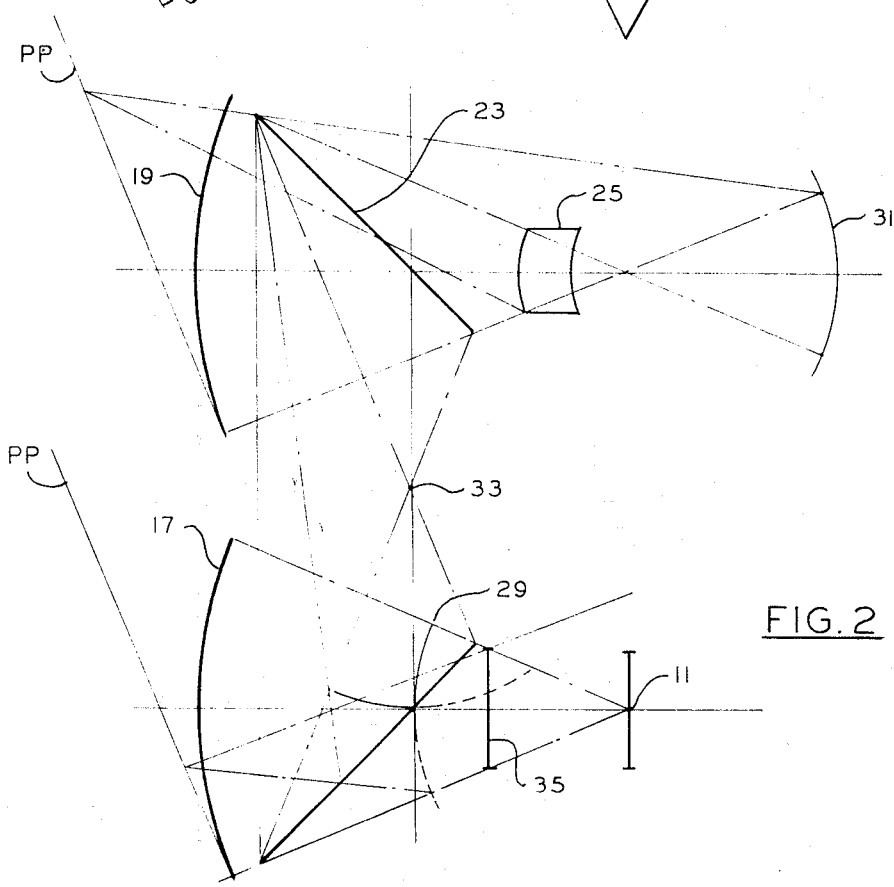
FIG. 2 is an elevation view of a section of FIG. 1.

FIG. 2 shows an elevation view of the system. The image produced by mirror 19 and beamsplitter 23 must fall at position 29 which is one-half the radius of mirror 17. Screen 25 is thus placed so that its image from mirror 19 will be at position 31 which when reflected by beamsplitter 23 will fall at position 29. As long as the reflections of the centers of curvature of mirrors 17 and 19 coincide at point 33 no correction is required.

The system allows unlimited horizontal head motion a feature lacking in most previous systems. Vertically head motion is more restricted but in most applications will normally not change much.

The only significant restriction in this display is the vertical field. The vertical field cannot exceed 46° (23° up and 23° down) at eyepoint 11. If the eyepoint is moved inside the center of curvature, (this of course would normally only be done where the display subtends less than 360°) the vertical field of view can be increased. The optimum point is at ⅔ the radius of the mirror. This is point 35. At this point, the vertical field of view in the forward direction is larger than the field of view from the center of curvature. The vertical field of view for the left and right edges is also larger.

Figure 3:
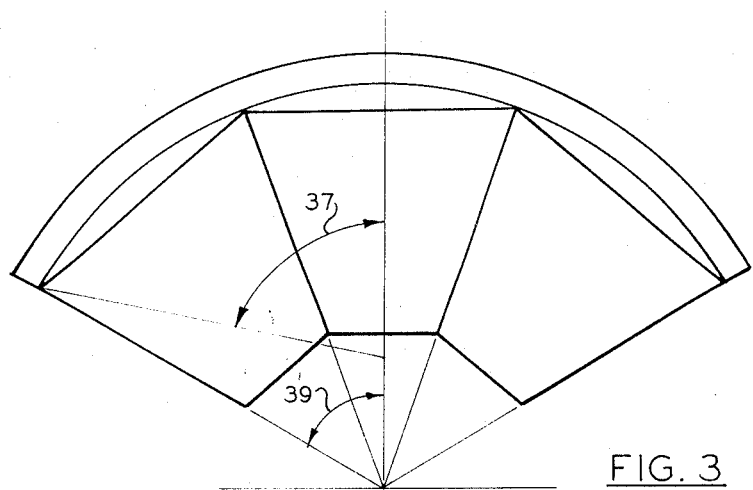
FIG. 3 is an elevation view showing arrangements to increase the vertical field of view of the system.

The horizontal field of view is also greatly increased. This increase can be seen by looking at the projection of the pupil onto the plan view of the mirror shown in FIG. 3. The new field of view is indicated by angle 37. The old field of view is indicated by angle 39.

Figure 4:
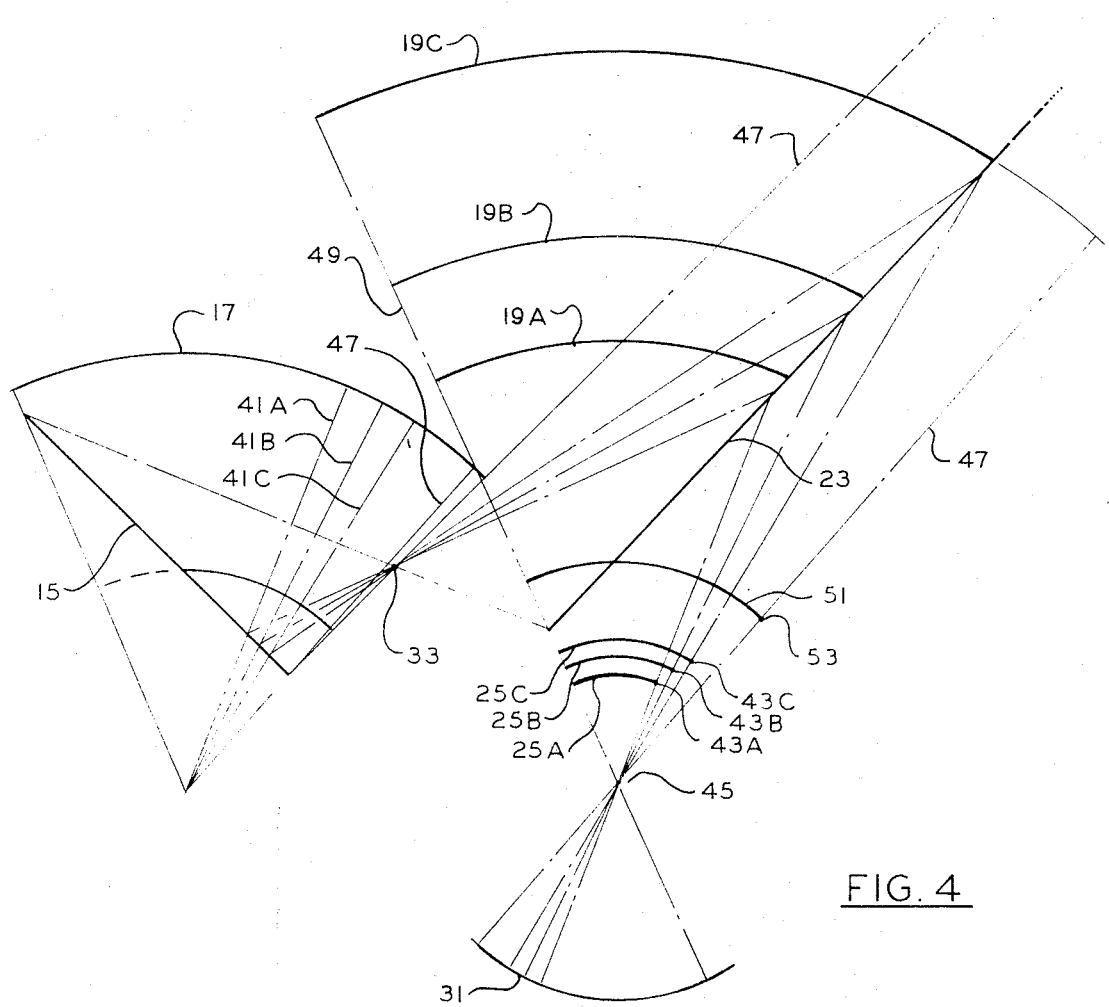
FIG. 4 is an elevation view of a section of FIG. 1 showing the effect of increasing mirror size.

Vertical field of view may also be increased by increasing the size of mirror 19 as shown in FIG. 4. The only constraint is that the reflected centers coincide at point 33.

The chief differences between this embodiment and the original one is that one of the mirrors can assume any relative size and still maintain the simple symmetry of the display. The advantage of increasing the size of this mirror is that the vertical field of view is greater. This increased vertical field of view can be seen by the addition of rays, 41A, 41B, and 41C. These rays all pass through the center of curvature and, therefore, can be simply projected through the system. After reflecting off mirror 17 they reflect off beamsplitter 15 and pass through the center of curvature 33. From here they proceed to beamsplitter 23.

Each of the rays 41A, 41B, and 41C correspond to a different size and location of the mirror. Ray 21A corresponds to the original configuration of mirror, 19A, source screen, 25A, and field edge 43A. Ray is reflected from beamsplitter, 15 to mirror, 19B. From 19B mirror, it is reflected through the center of curvature, 45, to the screen, 25B. The source of the imagery for this ray is point 43B.

Ray, 41C, reflects off beamsplitter, 15, and proceeds to mirror, 19C. It reflects off this mirror and intersects the screen surface, 25C at point 43C. If this process is continued, the limiting ray can be found. It is ray, 47, which intersects mirror, 17, at the point where this mirror intersects ray, 49, from the other field edge and the other mirror. This ray projected through the center of curvature, 33, is seen to emerge parallel to beamsplitter, 23. In order to achieve this field of view, the mirror, 19C and beamsplitter, 23, must be of infinite size. Therefore, the limiting vertical field is 45° up and 23° down (i. e., only the up angle is increased). The source screen, 51, is the source for this limiting case. The source point for the edge of the field is 53.

It is easy to see that the function of the two mirrors can be interchanged so that mirror, 19, becomes the collimating mirror for the imaging mirror, 17. As in the original embodiment surface 31, is the intermediate image formed by mirror 19. The distance of this intermediate image from the center of curvature must be constant for all mirror radii such as 19A, 19B and 19C, and in order for the symmetry of the display to be maintained.

Thus a visual system with a horizontal field of up to 360° which may have a single source as an input has been shown. Although some specific embodiments have been described it will be obvious to those skilled in the art that various modifications may be made without departing from the spirit of the invention which is intended to be limited solely by the appended claims.

I claim:

1. Visual display apparatus to present to an observer a large horizontal field of view comprising:
   a. at least one first spherical mirror shaped as at least a portion of the zone of a sphere arranged around the observer;
   b. a first plurality of abutting plane beamsplitters interposed between the observer and said spherical mirror arranged to reflect an image from above said spherical mirror onto said mirror, each of said plurality of beamsplitters cut so that their abutting edges fall in a plane passing through the center of curvature of the spherical mirror and a line of longitude thereon;
   c. a second similar spherical mirror placed above said first spherical mirror;
   d. a second equal plurality of plane beamsplitters arranged above corresponding ones of said first plurality to direct an image from said second spherical mirror to said first plurality of beamsplitters, the relative positioning of said second plurality and said second spherical mirror being such that the reflected center of curvature of said first spherical mirror and the reflected center of curvature of said second spherical mirror coincide, and;
   d. an image source providing an input to said second spherical mirror, said image source positioned so as to form, after being reflected, a virtual image at one-half the radius of said first spherical mirror.

2. The invention according to claim 1 wherein said image source is a spherical screen with an image projected thereon whereby a single input screen can supply the total image input.

3. The invention according to claim 1 wherein said spherical mirrors forming said zones comprise a plurality of abutting spherical mirrors.

4. The invention according to claim 1 wherein said first and second spherical mirrors and said first and second plurality of beamsplitters are identical.

5. The invention according to claim 1 wherein one of said first and second spherical mirrors and its corresponding plurality of beamsplitters are larger thereby increasing the vertical field of view.

6. The invention according to claim 1 wherein said spherical mirror subtends less than 360° and the observer eyepoint is placed inside the center of curvature of said first spherical mirror thereby increasing the horizontal field of view and the vertical field of view in the forward direction.

* * * * *